(12) United States Patent
Greenspan

(10) Patent No.: US 6,201,814 B1
(45) Date of Patent: *Mar. 13, 2001

(54) TELECOMMUNICATIONS ROUND-ROBIN MESSAGE DELIVERY

(75) Inventor: Steven Lloyd Greenspan, Scotch Plains, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/764,799

(22) Filed: Dec. 12, 1996

(51) Int. Cl.[7] .................................................. H04L 12/54
(52) U.S. Cl. ............................................. 370/428; 370/475
(58) Field of Search ................................... 370/270, 312, 370/349, 351, 400, 428, 474, 475, 260, 261, 262, 263, 264; 395/200.68, 200.75; 379/93.03, 93.24; 709/238, 243

(56) References Cited

U.S. PATENT DOCUMENTS

| | | | | |
|---|---|---|---|---|
| 5,200,951 | * | 4/1993 | Grau et al. | 370/261 |
| 5,247,615 | * | 9/1993 | Mori | 370/260 |
| 5,412,654 | * | 5/1995 | Perkins | 370/312 |
| 5,471,470 | * | 11/1995 | Shamar et al. | |
| 5,548,591 | * | 8/1996 | Horikoshi | 370/260 |
| 5,838,252 | * | 11/1998 | Kininis | 340/825.44 |
| 5,872,921 | * | 2/1999 | Zahariev et al. | |
| 5,878,230 | * | 3/1999 | Weber et al. | 395/200.68 |

FOREIGN PATENT DOCUMENTS 1309505   10/1992  (CA) .

OTHER PUBLICATIONS

Weinstein, "The Elm Users Guide," Elm User Guide, Version 2.4, pp. 1–16, Oct. 1.*

* cited by examiner

*Primary Examiner*—Huy D. Vu

(57) ABSTRACT

An improved messaging system for transmitting message information to a plurality of recipients comprises the steps of: sending a first message including the predetermined message information to a first recipient address of a first recipient on a list of recipients; updating, after the completion of the step of sending, the list of recipients to create an updated recipient list, the updating being implemented independently of the first recipient at the first recipient address; and sending a second message, including the predetermined message information to an address corresponding to a next recipient selected from the updated recipient list. The method can iteratively repeat the steps of updating and sending the message to thereby transmit messages to a plurality of recipients with the list of recipients being dynamically updated after each message is sent. The recipients may have an opportunity to modify or add to the message before the message is sent on to the next recipient.

43 Claims, 2 Drawing Sheets

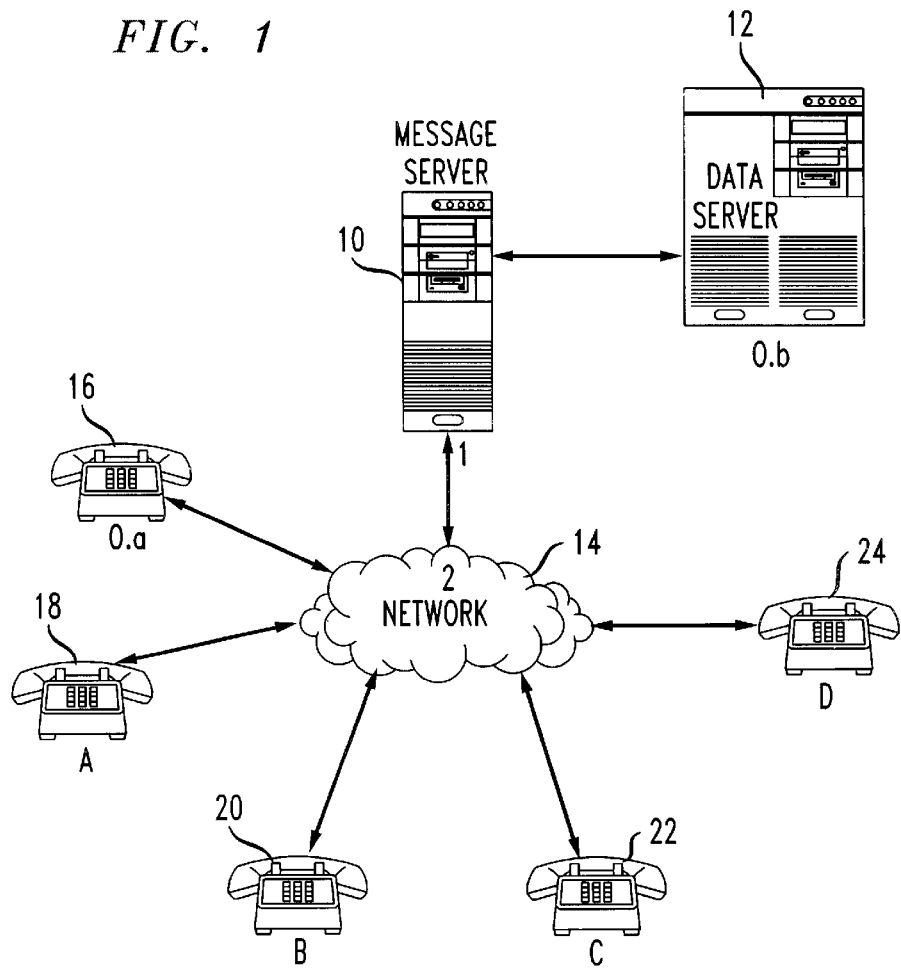

FIG. 3

| MESSAGE MANAGEMENT OBJECT | | |
|---|---|---|
| GROUP_ID | ROUND_ROBIN_MESSAGE_ID | MESSAGE_HEADER (POINTER) |
| | | |
| | | |
| ... | ... | ... |
| | | |

FIG. 4

| GROUP OBJECT, LABELED BY GROUP_ID | | |
|---|---|---|
| MEMBER_ID | MEMBER'S ADDRESS | MEMBER'S NAME |
| | | |
| | | |
| ... | ... | ... |
| | | |

FIG. 5

| ROUND ROBIN MESSAGE OBJECT, LABELED BY ROUND_ROBIN_MESSAGE_ID | | |
|---|---|---|
| MEMBER_ID | STATUS | INDIVIDUAL_RESPONSES |
| | | |
| | | |
| ... | ... | ... |
| | | |

TELECOMMUNICATIONS ROUND-ROBIN MESSAGE DELIVERY

FIELD OF THE INVENTION

The present invention relates to messaging systems and, in particular, to an improved electronic messaging system for sending and receiving message information among a plurality of users.

BACKGROUND OF THE INVENTION

Electronic mail (or "e-mail") message delivery systems as well as voice mail systems have gained significantly in popularity in recent years, enabling information to be efficiently and rapidly communicated to large numbers of people. Such systems allow groups of people to communicate without having to arrange a specific time to meet or talk on the telephone.

The sender of a voice or e-mail message can designate any number of addressees, and can request a reply from the addressees. In this way, for example, a proposal could be sent to a number of people for review and comment, with the reviewers replying directly to the sender of the message.

SUMMARY OF THE INVENTION

The present invention is an improved messaging system that allows, among other things, greater flexibility in both the way that messages are delivered to a number of recipients, as well as in the determination of the recipients.

In summary, the preferred embodiment of the invention provides, among other things, a "round-robin" messaging system wherein a message is sent to a first recipient, and is then automatically passed to a second, and then to a third, etc., until the message is returned to the original sender. Each recipient has the opportunity to modify the message information (including adding new comments) before the system passes on the message.

Round robin messaging is useful, for example, in having a number of members of a team review and comment on a proposal or document. In preferred embodiments, the author of the original message sets up the message by identifying all members of the team, and the document to be transmitted. The preferred system then transmits the message to the first recipient along with the list of the other recipients. After the first recipient reviews and possibly comments on or modifies the message, the preferred system sends the message to the next recipient along with the first recipient's comments. This process preferably continues until the message returns to the original sender along with the comments, if any, of each recipient.

More specifically, in one aspect, the invention features a system and method for operating an electronic messaging system to transmit message information to a plurality of recipients, the method comprising the steps of: sending a first message including the message information to a first recipient address of a first recipient on a list of recipients; providing the first recipient with an opportunity to modify the message information (i.e., adding to or changing the message information); determining an address corresponding to a second recipient selected from the recipient list; and sending a second message, including the message information with any modifications made by the first recipient, to the address corresponding to the second recipient.

In another aspect, the present invention features a system and method for operating an electronic messaging system to transmit message information to a plurality of recipients, the method comprising the steps of: sending a first message including the predetermined message information to a first recipient address of a first recipient on the list of recipients; updating, after the completion of the step of sending, the list of recipients to create an updated recipient list, the updating being implemented independently of the first recipient at the first recipient address; and sending a message, including the predetermined message information, to an address corresponding to a next recipient selected from the updated recipient list.

In preferred embodiments, the method further comprises the additional step of generating the message sent to the next recipient, including providing the first recipient with an opportunity to modify the first message.

The method can iteratively repeat the steps of updating and sending the second message to thereby transmit messages to a plurality of recipients with the list of recipients being updated after each message is sent and with each recipient having an opportunity to modify the message.

The message sent to the next recipient can be identical to the first message if either no opportunity is provided to a recipient to modify the message or if the recipient chooses not to modify the message.

The method can further comprise the step of sending the list of recipients to the first recipient address such that the subsequent steps can be carried out by a system local to the first recipient (e.g., the first recipient's PC or workstation).

The method can include a step of providing a list of recipients (and updating the recipient list) by accessing a database and selecting recipients that satisfy a predetermined criteria (e.g., individuals interested in the stock market). Furthermore, the method can be initialized by monitoring a database to determine whether a predetermined criteria has been satisfied (e.g., the stock market hitting a new high); and performing the steps of the invention only in the event that the predetermined criteria has been satisfied.

The method can also comprise the step of providing the first recipient with an opportunity to modify the recipient list, which preferably would occur after the step of updating.

In yet another aspect, the invention features a method for operating an electronic messaging system to transmit message information to a plurality of recipients comprising the steps of: sending a message including the predetermined message information to a first recipient address of a first recipient on a list of recipients; providing an opportunity for a current recipient of the message to modify the message; updating the list of recipients to create an updated recipient list, the updating being implemented independently of the current recipient; sending the message to an address corresponding to a next recipient selected from the updated recipient list; and iteratively repeating the steps of sending a message, providing an opportunity to modify, updating and sending the message to an address corresponding to a next recipient to thereby transmit the message to a plurality of recipients with the list of recipients being dynamically updated.

BRIEF DESCRIPTION OF THE DRAWINGS

FIG. 1 is an overall system diagram illustrating the system used to implement the preferred embodiment of the invention.

FIG. 2 is a table showing the structure of certain criteria objects used with the preferred embodiment.

FIG. 3 is a table showing the structure of certain message management objects used with the preferred embodiment.

FIG. 4 is a table showing the structure of certain round robin group objects used with the preferred embodiment.

FIG. 5 is a table showing the structure of certain round robin message objects used with the preferred embodiment.

DETAILED DESCRIPTION OF THE PREFERRED EMBODIMENTS

Referring to FIG. 1, a message server 10 is connected to a data server 12, as well as to a network 14. Also connected to network 14 are a number of user stations, such as stations 16, 18, 20, 22 and 24.

Message Server 10 can be any standard digital computer and, for voice mail applications, is preferably a AINet® SCN (i.e., service circuit node) system, made by Lucent Technologies. For e-mail, a Sun Microsystems Solaris® work station can be used. Data server 12 can also be a Solaris® work station. Network 14 can be an appropriate communication system, as is well known to those of skill in this field. For example, any public switch telephone network can be used for voice mail. For e-mail, the internet can be used, as is well known. The user stations can be any appropriate communication device, e.g., standard telephones, Pcs, work stations or other suitable systems delivering access to network 14.

In operation, message server 10 initiates a message to M individuals (at user stations 16–24), in any one of a number of ways, using network 14. For example, a message can be initiated by an individual having access through a user station or the system can initiate the message periodically (such as once per day), continuously, or whenever a well-defined event occurs (such as a new Dow Jones Index record high, or a news headline about a certain topic of interest).

Once the message initiation has begun, message server 10 sends an initial message (e.g. a stock quote or a message from an individual initializing the message) to a first recipient on a list of recipients. (The compilation of the list of recipients is explained below.) The message can be text, voice, graphics or any combination of the three, being limited only by the choice of the user stations (e.g., some telephones cannot display text and graphics). The system then asks for any further message that is to be distributed to the other individuals on the list along with the initial message and may provide an opportunity for the recipient to modify the initial message. When this message and/or any modifications to the initial message are recorded, the system then contacts the next individual on the list, delivers the initial message and the message from the first called party (if any), and asks for any additional message. When any additional message has been recorded, the system contacts the third individual, delivers the initial and first two messages, and asks for a third message, etc. This continues until the list of M individuals is exhausted, and then either terminates or begins again by playing N messages to the first individual, where N is any predefined number, e.g., M−1.

The number of messages, N, repeated to an individual can be independent of the number of individuals in the list. Furthermore, messaging can occur even if one or several individuals don't respond; the system would continue with the next listed individual. An individual does not hear the reply to her or his message until all other individuals, that were reachable, have received and replied to that message.

The determination of the individuals on the list to whom a message will be sent can be achieved in any one of several ways. The system can compile the list at the time of initial message generation using some predetermined criteria. For example, perhaps all individuals in a particular department will be recipients of the message. The system compiles the list of recipients from an appropriate database (e.g., data server 12) and then proceeds as above to contact the first individual on the list. In this way, the user originating the message does not have to compile the list and the list will be the most up to date version of the department list, etc.

Furthermore, the system can reevaluate the list as the message propagates from one recipient to the next to ensure that any relevant changes to those who should be on the list are dynamically incorporated into the list. As an example, consider a message initially generated by the head of a department (e.g. "department A") to be transmitted to all members of department A. Further assume that, during message propagation (i.e., when the system is working its way down the recipient list generated when the message was created) the membership of department A fluctuates due to either new members joining the department and/or some members leaving. In the preferred embodiment, the system will recompile the recipient list at various times during propagation and will therefore adjust for such fluctuations.

Preferably, the recipient list is compiled after each recipient is contacted. Such recompilation can occur before, during or after the message is read and possibly modified or added to by the current recipient. The same algorithm used to generate the initial list can be implemented to regenerate the list at such times.

Furthermore, a given recipient can modify either the recipient list directly or the algorithm used to generate the list. As an example, consider a member of department A who receives the message discussed above. This member might decide that the members of department B should also be on the recipient list and might therefore tell the system to adjust the recipient list generation algorithm to include department B. The original generator of the message (the head of department A in this example) can either allow for such modifications to the recipient list generation algorithm or can instruct the system not to accept changes to the algorithm from any recipient. Furthermore, the system could be configured (possibly by instruction from the message originator) to permit only certain individuals (e.g., managers) to modify the recipient list or the recipient list generation algorithm.

Notable service parameters controlling the round robin messaging of the preferred embodiment are discussed next (some of which were mentioned above).

A Message Deletion Algorithm can be used for deleting messages according to some predetermined criteria. For example, a first-in, first out N=M−1 algorithm can be used, where N is the maximum number of messages delivered and M is the number of individuals on the list. This example would allow an individual to hear all the messages recorded subsequent to the last message he or she left.

A Round Robin Start/Stop Algorithm is preferably used for initiating a round robin message. For example, the messaging could be automatically initiated whenever a stock profile changes dramatically and terminate when the list of individuals is exhausted. Alternatively, the round robin messaging, once started, could continue until the service is terminated. The latter might be used by a family or community wanting to stay in touch through continuous messaging. Additionally, as also noted above, the message can be manually initiated by one of the list members.

A System Response to No-Answer Algorithm will handle the situation where a particular recipient does not respond to the message. If the service is unable to deliver a message to an individual, the service could leave the message in her or his voice mailbox and continue to call the other members of the list. Alternatively, the system could continue to attempt delivery until the desired individual answers the call or until a predetermined number of attempts occur or a predetermined time period has elapsed.

A Sorting Algorithm determines the order in which the recipients on the recipient list will be contacted. The recipient list could be sorted by chronology or according to some other sorting criteria (e.g., oldest to newest member, by seniority, by a predetermined order, by the level of involvement in or interest in a certain project, etc.).

A Manual or Dynamic Recipient List Update Algorithm (i.e., the recipient list generation algorithm discussed above) is used to adjust the recipient list during message propagation, as discussed in detail above. Members can delete themselves from the list or add others by interacting with the service in real time, or the list can be dynamically created from other information, e.g., a database of individuals belonging to a community organization.

A Whisper Option allows a recipient to record a message for particular members of the group only. Such a message would then "travel" with the other messages, but would be played only for the designated recipients.

A Forwarding Option allows recipients to broadcast or forward the message to others not on the list.

A No-Response Option would allow some members of the list to be defined as passive recipients, i.e., such members receive the messages but can not change or add to the message. The passive recipient can receive the message at any desired time during message propagation. For example, the passive recipient might receive only the initial message or might receive all messages once the message has propagated through the entire list. Any desired point or points between these extremes could also be selected (i.e., after a predetermined recipient has received and commented, after some number of recipients have received and commented or after some elapsed time period or periods).

Referring again to FIG. 1, the operation of the preferred embodiment will be discussed in relation to certain preferred objects illustrated in FIGS. 2–5.

In operation, Message Server 10 receives a message from either: (1) data server 12; or (2) an individual subscriber at one of user stations 16–24; or (3) from an individual non-subscriber with access to Network 14; or (4) from internally generated subsystem (e.g., an internal clock).

In Message Server 10, the message or message header is matched against criteria in a Criteria Object (FIG. 2). Examples of criteria include: (c) name or address (BTN.e-mail) of message sender; calendar date and/or time; message received from Data Server in response to some measurable shift in some database from which the Data Server receives information (e.g., a 5% fluctuation in employment rate, consumer confidence index, etc.)

Each Criteria Object contains for each criteria:
(1) A Trigger__Criteria field, describing the criteria (as described above) for initiating a sequential or round-robin messaging cycle.
(2) A Group__ID, a point to a Group Object (see FIG. 4).
(3) A List__Type, describing the way in which group members are reached and the message delivery cycle is terminated, e.g. "terminate messaging after last member in group is reached", or "terminate messaging only if group administrator signals termination" (in this case, the messaging continues to cycle through group members). List__Type also codes the length of the message set, e.g., "all message replies", or "the last N replies received, where N is one less than the number of group member" (applicable if the messaging continues through multiple cycles of delivery).
(4) A List__Order, specifying the order in which members receive messages for a given criteria. For example, for a significant shift in stock market averages, Member A should be contacted first followed by Member B, etc. But for a significant shift in the Consumer Confidence Index, Member B should be contacted first, then Member D, then Member A.
(5) A Message__Header, a pointer to a file, or ordered list of files (continuing text, images, or digitized recordings) that are used as the message header when a message is delivered for that combination of criteria and group. When a voice or e-mail message to a group initiates the message delivery, that message would likely be part of the header.

If a criteria match is found then an entry is created in Message Management Object (see FIG. 3) using the Group__ID and Criteria specified in the Criteria Object, and a Message__ID is assigned. The Entry is deleted when the message cycle is terminated.

The Message Management Object contains the following three fields:
(1) Group ID (as described above),
(2) Message__Header (as described above), and
(3) Message__ID (uniquely assigned, and used to track "live" messages).

Next, a Message Object is created using the information in the Message Management Object, and in the Group Object. The Group Object (FIG. 4) is referenced through the Group__ID in the Criteria Object and contains:
(1) a unique identifier,
(2) a name, which could point to a text and/or digitized recording of the name,
(3) an address, and
(4) a group position (implicitly), of each group member.

Additionally, the data object could contain specifics about alternate reach numbers, preferred calling (and call blocking) times, etc.

The Message Object (FIG. 5) is referenced though the Message Management Object and contains for each "live message":
(1) Member__ID (as described above);
(2) Status, describing whether or not message delivery has been attempted (and succeeded); and
(3) Response, a point to a digitized recording (in the case of voice mail) or text file (in the case of e-mail).

Following the creation of the Message Object, message delivery begins. The following illustrates a possible sequence for voice or fax deliveries:
(1) Attempt call to first member listed in Message Object (for exposition, this name will be referred to as Name A.) The Member__ID is used to index the Member's address that is stored in the Group__Object.
(2) If no answer, retry up to and including the number of attempts specified in the Attempts field of the Criteria Object.
(3) If answer, introduce message by playing message header. This might happen in this way:
"Message for [Name A]. If this is [Name A] say 'yes'."
Person receiving call says 'yes'.
"Please respond to the following: [Criteria specific message, e.g., 'The unemployment rate decreased by 3% during June']. Please record your response". Person records a response.

"Thank you. To listen to your response, say 'repeat it', to re-record, say . . ."

(4) Next, the list of group members is reconfigured to account for any changes in the recipient list, as discussed above.

(5) Then, call the next member (Name B) listed in the Message Object. If the person answers, the following interaction might occur:

"Message for [Name B]. If this is [Name B] say 'yes'." Person receiving call says 'yes'.

"Please respond to the following: [Criteria specific message, e.g., 'The unemployment rate decreased by 3% during June' and message recorded by Name A, if any.] Please record your response". Person records a response.

"Thank you. To listen to your response, say 'repeat it', to re-record, say . . ."

(6) message delivery continues with Name C hearing Name A's and B's responses, and adding his or her own.

If the List_type specifies that delivery terminates when the last member receives the messages then the message is deleted from the Message Management Object, and the Message Object is destroyed along with all recorded responses. Alternately, termination could be delayed until all members have heard all other members responses at least once, or the message cycle could continue indefinitely. The latter might occur among a group of people who wish to stay in touch on a continual basis using automated messaging.

The above description of the preferred embodiments is intended to be merely an example of the inventive features of the present invention and many modifications will be possible without departing from the spirit of the invention or the scope of the appended claims.

What is claimed is:

1. A method for operating an electronic messaging system to transmit message information to a plurality of recipients comprising the steps of:
   (a) sending a first message including said message information to a first recipient address of a first recipient on a list of recipients;
   (b) providing said first recipient with an opportunity to modify said message information;
   (c) modifying said message information;
   (d) determining an address corresponding to a second recipient selected from said recipient list;
   (e) sending a second message, including said message information with modifications made by said first recipient in step (c), to said address corresponding to said second recipient; and
   prior to steps (a)–(e) monitoring a database to determine whether a predetermined criteria independent of the electronic messaging system has been satisfied and performing steps (a)–(e) only in the event that said predetermined criteria has been satisfied.

2. The method of claim 1 wherein said determining is implemented independently of said first recipient at said first recipient address.

3. The method of claim 1, further comprising the steps of:
   (f) providing said second recipient with an opportunity to modify said message information;
   (g) determining an address corresponding to a third recipient selected from said recipient list; and
   (h) sending a third message, including said message information with any modifications made by said first recipient in step (c) and said second recipient in step (f), to said address corresponding to said third recipient.

4. The method of claim 1 wherein steps (a)–(e) are iteratively repeated to thereby transmit messages to a plurality of recipients with each of said recipients being provided with an opportunity to modify said message information.

5. The method of claim 4 wherein after said messages have been transmitted to said plurality of recipients, said message information, as modified by said recipients, is transmitted to an originator of said first message.

6. The method of claim 5 further comprising the step of updating said list of recipients after each implementation of step (a).

7. The method of claim 1 further comprising the step of updating said list of recipients after the implementation of step (a).

8. The method of claim 1 wherein step (a) further comprises sending said list of recipients to said first recipient address and implementing steps (b), (c), (d) and (e) using a system local to said first recipient.

9. The method of claim 8 wherein steps (b), (c), (d) and (e) are iteratively repeated to thereby transmit messages to a plurality of recipients with said list of recipients being updated after each implementation of step (d) (e) by each of a plurality of respective systems local to each recipient.

10. The method of claim 1 further comprising the step of accessing a database and selecting recipients that satisfy a predetermined criteria to thereby generate said list of recipients.

11. The method of claim 1 further comprising the step of providing said first recipient with an opportunity to modify said recipient list.

12. A method for operating an electronic messaging system to transmit message information to a plurality of recipients comprising the steps of:
   (a) sending said predetermined message information to a first recipient address of a first recipient on a list of recipients;
   (b) providing an opportunity for a current recipient of said message information to modify said message information;
   (c) automatically updating said list of recipients to create an updated recipient list, said updating being implemented independently of said plurality of recipients;
   (d) sending said message information to an address corresponding to a next recipient selected from said updated recipient list created in step (c); and
   (e) iteratively repeating steps (b)–(d) to thereby transmit said message information to a plurality of recipients with said list of recipients being automatically updated after each implementation of step (d).

13. The method of claim 12 wherein step (a) further comprises sending said list of recipients to said first recipient address and implementing steps (b)–(e) using a plurality of respective systems local to said recipients.

14. The method of claim 12 further comprising the step of accessing a database and selecting recipients that satisfy a predetermined criteria to thereby generate said list of recipients.

15. The method of claim 12 wherein after said message information has been transmitted to said plurality of recipients, said message information, as modified by said recipients, is transmitted to an originator of said first message.

16. The method of claim 12 further comprising the following additional steps carried out prior to steps (a)–(e):
  monitoring a database to determine whether a predetermined criteria has been satisfied; and
  performing steps (a)–(e) only in the event that said predetermined criteria has been satisfied.

17. A method for operating an electronic messaging system to transmit message information to a plurality of recipients comprising the steps of:
  (a) sending a first message including said message information to a first recipient address of a first recipient on a list of recipients, the list of recipients maintained independently of said plurality of recipients;
  (b) automatically updating, after the completion of step (a), said list of recipients to create an updated recipient list, said updating being implemented independently of said first recipient at said first recipient address; and
  (c) sending a message, including said predetermined message information, to an address corresponding to a next recipient selected from said updated recipient list created in step (b).

18. The method of claim 17 further comprising, after the completion of step (a), the additional step (a2) of generating said message sent in step (c).

19. The method of claim 18 wherein steps (a2), (b) and (c) are iteratively repeated to thereby transmit messages to a plurality of recipients with said list of recipients being updated after each implementation of step (c).

20. The method of claim 17 wherein steps (b) and (c) are iteratively repeated to thereby transmit messages to a plurality of recipients with said list of recipients being updated after each implementation of step (c).

21. The method of claim 20 wherein messages are generated by providing a current recipient with an opportunity to modify said message information before each iteration of step (c).

22. The method of claim 21 wherein after said messages have been transmitted to said plurality of recipients, said message information, as modified by said recipients, is transmitted to an originator of said first message.

23. The method of claim 17 wherein step (a) further comprises sending said list of recipients to said first recipient address and implementing steps (b) and (c) using a system local to said first recipient.

24. The method of claim 23 wherein steps (b) and (c) are iteratively repeated to thereby transmit messages to a plurality of recipients with said list of recipients being updated after each implementation of step (c) by each of a plurality of respective systems.

25. The method of claim 17 further comprising the step of accessing a database and selecting recipients that satisfy a predetermined criteria to thereby generate said list of recipients.

26. The method of claim 17 further comprising the following additional steps carried out prior to steps (a)–(c):
  monitoring a database to determine whether a predetermined criteria has been satisfied; and
  performing steps (a)–(c) only in the event that said predetermined criteria has been satisfied.

27. The method of claim 17 further comprising the step of providing said first recipient with an opportunity to modify said recipient list.

28. The method of claim 17 wherein said message sent in step (c) is identical to said first message.

29. A method for operating an electronic messaging system to transmit message information to a plurality of recipients comprising the steps of:
  (a) sending a message including said message information to a first recipient address of a first recipient on a list of recipients, the list of recipients maintained independently of said plurality of recipients;
  (b) providing an opportunity for a current recipient of said message to modify said message;
  (c) automatically updating said list of recipients to create an updated recipient list, said updating being implemented independently of said current recipient;
  (d) sending said message to an address corresponding to a next recipient selected from said updated recipient list created in step (b); and
  (e) iteratively repeating steps (b)–(d) to thereby transmit said message to a plurality of recipients with said list of recipients being automatically updated after each implementation of step (d).

30. An apparatus for transmitting message information to a plurality of recipients comprising:
  a list of recipients to which predetermined message information will be sent;
  a transmission medium for sending a first message including said message information to a first recipient address of a first recipient on said list of recipients;
  an input device for modifying said message information;
  a first recipient processor for selecting a second recipient from said recipient list having a second address and sending a second message, including said message information with modifications made by said first recipient to said address corresponding to said second recipient; and
  wherein said list of recipients is automatically updated independent of the plurality of recipients before said second message is sent.

31. The apparatus of claim 30 wherein said processor selects said second recipient independently of said first recipient at said first recipient address.

32. The apparatus of claim 30 further comprising:
  a second input device for providing said second recipient with an opportunity to modify said message information;
  a second recipient processor for selecting a third recipient from said recipient list and sending a third message, including said predetermined message information with any modifications made by said first recipient and said second recipient to said address corresponding to said third recipient.

33. The apparatus of claim 32 wherein said first recipient processor and said second recipient processor are the same processor.

34. The apparatus of claim 32 wherein after said messages have been transmitted to said first and second recipients, said message information, as modified by said recipients, is transmitted to an originator of said first message.

35. The apparatus of claim 32 further comprising means for updating said list of recipients after said second message is sent and after said third message is sent.

36. The apparatus of claim 30 wherein said list of recipients is also sent to said first recipient address.

37. The apparatus of claim 30 wherein said list of recipients is created by accessing a database and selecting recipients that satisfy a predetermined criteria.

38. The apparatus of claim 30 further comprising means for monitoring a database to determine whether a predetermined criteria has been satisfied and wherein said first message is sent only in the event that said predetermined criteria has been satisfied.

39. The apparatus of claim 32 further comprising means for providing said first recipient with an opportunity to modify said recipient list.

40. A method for operating an electronic messaging system to transmit message information to a plurality of recipients comprising the steps of:
- (a) sending a first voice mail message including said message information to a first recipient address of a first recipient on a list of recipients, the list of recipients maintained independently of said plurality of recipients;
- (b) providing said first recipient with an opportunity to modify said message information;
- (c) automatically updating said list of recipients to create an updated recipient list, said updating being implemented independently of said first recipient;
- (d) determining an address corresponding to a second recipient selected from said recipient list; and
- (e) sending a second voice mail message, including said message information with any modifications made by said first recipient in step (b), to said address corresponding to said second recipient.

41. The method of claim 40 wherein said first recipient does not modify said message information such that said second message is identical to said first message.

42. An apparatus for transmitting message information to a plurality of recipients comprising:
- a list of recipients to which predetermined message information will be sent;
- a transmission medium for sending a first voice mail message including said message information to a first recipient address of a first recipient on said list of recipients;
- an input device for providing said first recipient with an opportunity to modify said message information;
- a first recipient processor for selecting a second recipient from said recipient list having a second address and sending a second voice mail message, including said message information with any modifications made by said first recipient to said address corresponding to said second recipient; and
- wherein said list of recipients is automatically updated independent of the plurality of recipients before said second message is sent.

43. The apparatus of claim 42 wherein said first recipient does not modify said message information such that said second message is identical to said first message.

* * * * *